United States Patent [19]

Shiun et al.

[11] 4,364,042

[45] Dec. 14, 1982

[54] DATA-TRANSMISSION AND DATA-PROCESSING SYSTEM

[75] Inventors: Toshimi Shiun; Hideo Fujii, both of Toda, Japan

[73] Assignee: Clarion Co., Ltd., Tokyo, Japan

[21] Appl. No.: 185,562

[22] Filed: Sep. 9, 1980

[30] Foreign Application Priority Data

Sep. 14, 1979 [JP] Japan .................................. 54-117374

[51] Int. Cl.³ .......................... H04Q 9/00; H04J 3/12
[52] U.S. Cl. ................................ 340/825.04; 370/112
[58] Field of Search ........... 340/168 R, 168 S, 825.04; 370/112

[56] References Cited

U.S. PATENT DOCUMENTS 3,912,872 10/1975 Callens ................................ 370/112
4,114,138 9/1978 Demers .......................... 340/168 R Primary Examiner—Donald J. Yusko

[57] ABSTRACT

A data-transmission and data-processing system wherein a central station transmits, to decoders of data receiving stations, data comprised of address data and condition data which are adapted corresponding to the respective decoders for attaining desired accessing, and each of the decoders extracts the address data and the condition data from the data received thereby, compares the extracted address and condition data and an address of the decoder and outputs the condition data in response to a result of the comparison.

2 Claims, 3 Drawing Figures

DATA-TRANSMISSION AND DATA-PROCESSING SYSTEM

BACKGROUND OF THE INVENTION

1. Field of the Invention

This invention relates to a data-transmission and data-processing system, and more particularly to an improved data-transmission and data-processing system which is capable of curtailing a time required for accessing, by data from a single central station, data receiving stations selected from a plurality of data receiving stations.

2. Description of the Prior Art

In a known pay-TV system, an address of every decoder to be accessed must be transmitted so that a broadcasting station may access decoders of receiver units, addressing respective decoders. It takes a considerable time to access a large number of decoders unless data transmission speed can be increased. Thus, this conventional system has been impracticable.

It is now assumed that there are N decoders which are all in the condition of "X" and that it is now desired to put decoders having addresses $A_n$ to $A_m$ into the condition of "Y" and put the remaining decoders into the condition "Z". In the case where the data to be transmitted by the broadcasting station includes both A (address) and condition indication, the format of the data is:

$$A_0 Z \cdot A_1 Z \ldots A_{n-1} Z \cdot A_n Y \cdot A_{n+1} Y \ldots A_m Y \cdot A_{m+1} Z \ldots A_N Z$$

Therefore, if it takes a time t to transmit one item of data, a time required for transmitting all of the data will be Nt. Thus, as described above, the required time becomes longer as the number of items of data to be transmitted increases.

OBJECT OF THE INVENTION

It is an object of the present invention to provide a data-transmission and data-processing system which is capable of curtailing the time required for data-transmission and simplifying an access data format from a broadcasting station to decoders.

SUMMARY OF THE INVENTION

In accordance with the present invention, there is provided a data-transmission and data-processing system comprising a plurality of data receiving stations each having respective decoders and a central station for transmitting data containing address data and condition data to the decoders of the data receiving stations to be accessed, each of said decoders including:

data extracting means for extracting the address data and the condition data from the data received by the respective decoder;

address generating means for generating an address of the respective decoder;

comparing means for comparing the address data and condition data extracted by said data extracting means, and the address generated from said address generating means; and an output means for outputting said condition data in response to a comparison output from said comparing means.

DESCRIPTION OF THE PREFERRED EMBODIMENT

Figure 1:
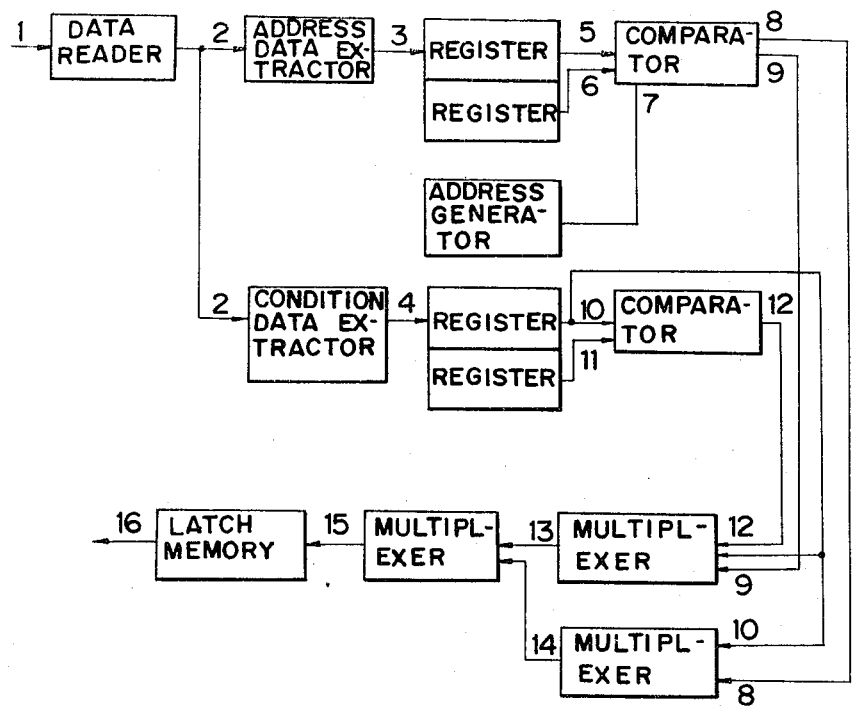
FIG. 1 is a block diagram of one form of a processing circuit in a decoder embodying the present invention.

The invention will now be described referring to an embodiment as illustrated in the drawings. FIG. 1 shows one form of a processing circuit provided in a decoder according to the invention. In the figure, A is a data reader, B an address data extractor, C a condition data extractor, D a register for storing address data, E a register for storing address data preceding the address data stored in the register D, F a comparator, G an address generator for generating the address of the decoder, H a register for storing condition data, I a register for storing condition data preceding the condition data stored in the register H, J a comparator, K, L and M multiplexers and N a condition latch memory.

It is now assumed that decoders having addresses $A_k$ and $A_l$ to $A_m$ among N decoders having addresses $A_1 \sim A_N$ ($A_1 < A_N$) are to be accessed so as to change their condition from X to Z (or from Z to X) and the remaining decoders are not accessed. Where there is a relation $K < l < m < N$, the transmission format in the conventional system must be:

$$A_k Z \cdot A_l Z \cdot A_{l-1} Z \ldots A_{m-1} Z \cdot A_m Z$$

and the number of data items to be transmitted is $1 + (m-1)$. By contrast, the transmission format in the present system will be:

$$A_l Z \cdot A_m Z \cdot A_k Z$$

and the number of data items to be transmitted is three.

Data 1 received by the decoder contains address data and condition data and is read by the data reader A. An output 2 from the data reader A is delivered to the data extractors B and C.

The data extractor B extracts address data 3 from the data 2 of the data reader A to store the same in the register D. The register E receives from the register D address data preceding the address data stored in the register D and stores the same therein.

The extractor C extracts condition data from the data 2 to store it in the register H. The register I receives condition data preceding the condition data stored in the register I to store the same therein.

The comparator F compares address data 5 and 6 from the address data storing registers D and E and address data 7 from the address generator G with respect to their greatness. When the address data 5 is equal to the address data 7, "1" is generated as an output 8 and when the address data 5> the address data 7> the address data 6, "1" is generated as an output 9. In other cases, "0" is generated.

The comparator J compares condition data 10 and 11 from the condition data storing registers H and I and generates "1" as an output 12 when the condition data 10 is equal to the condition data 11 and generates "0" in other cases.

The multiplexer K receives the output 9 from the comparator 8, the output 12 from the comparator J and the condition data 10 from the register H. The multiplexer L receives the condition data 10 from the register H and the output 8 from the comparator F. The multiplexer K outputs the condition data 10 as an output 13 when both the outputs 9 and 12 from the comparators F and J are "1", while the multiplexer L outputs the condition data 10 as an output 14 when the output 8 from the comparators F is "1".

The multiplexer M allows either of the outputs 13 and 14 to be outputted as 15, which is stored in a condition latch memory N and derived as an output 16 according to necessity.

Thus, when the data format is $A_l Z \cdot A_m Z$, all the decoders having addresses $A_x$ expressed as $A_l \leq A_x \leq A_m$ are accessed. On the other hand, when the format contains different condition data like $A_l Z \cdot A_m Y$, only a decoder having an address $A_l$ becomes "Z" and only a decoder having an address $A_m$ becomes "Y" as in the case of ordinary data transmission format. However, when the format is $A_m z \cdot A_l Z$ (m>1) to put only the decoders having the addresses $A_l$ and $A_m$ to "Z", decoders having respective addresses $A_x$ expressed as $A_l < A_x < A_m$ are not operated and accessed.

Figure 3:
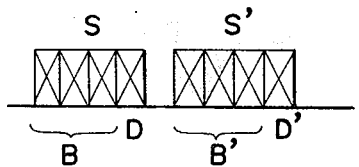
FIG. 3 is a formation of data to be transmitted.
Figure 2:
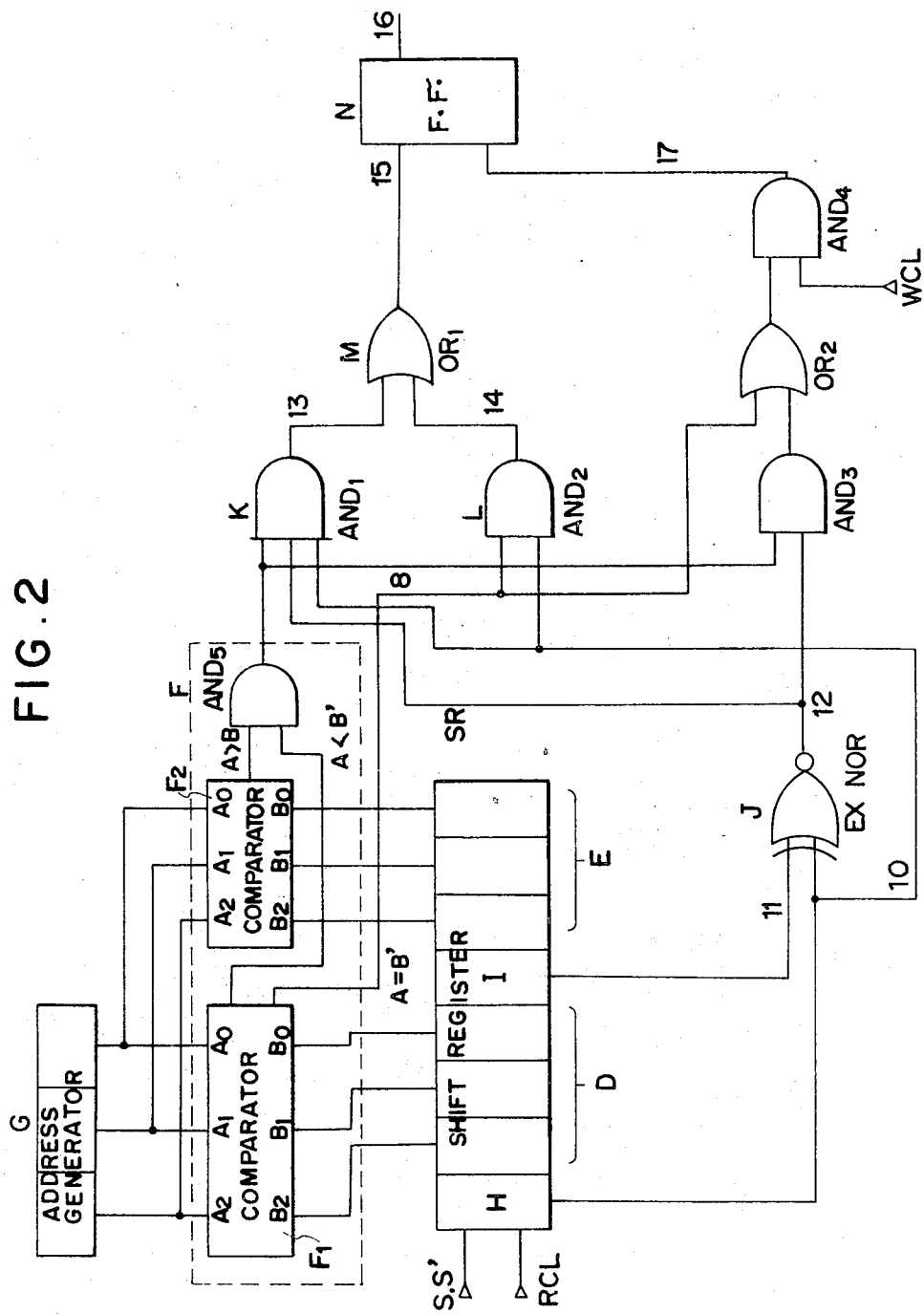
FIG. 2 is a specific arrangement of the processing circuit as illustrated in FIG. 1.

FIG. 2 illustrates specific arrangement of the processing circuit as described above. In this arrangement, two succeeding data S and S' each have three bits for respective addresses B and B' and one bit for respective condition data D and D' as illustrated in FIG. 3. A writing clock WCL is supplied during an interval between the two data.

In FIG. 2, SR is a 8-bit shift register and receives data 1 in response to a reading clock RCL. The shift register SR corresponds to the elements A, B, C, D, E, H and I as illustrated in FIG. 1. F designates a comparator circuit comprised of comparators $F_1$ and $F_2$ and an AND circuit $AND_5$. An address generator G produces a 3-bit address A for a decoder. This address A ($=A_0, A_1, A_2$) is compared, at the comparators $F_1$ and $F_2$, with addresses B ($B_0, B_1, B_2$) and B' ($B'_0, B'_1, B'_2$) stored at the shift register SR. The signal 9 becomes "1" when $A>B$, $A>B'$ and the signal 8 becomes "1" when $A=B$.

EX NOR is an EXCLUSIVE-NOR circuit which corresponds to the comparator J in FIG. 1 and turns the signal 12 into "1" only when the data 10 and 11 are equal to each other.

AND circuits $AND_1$ and $AND_2$ and an OR circuit $OR_1$ correspond to the multiplexers K, L and M in FIG. 1, respectively, and F.F. is a D- type flip-flop circuit and corresponds to the latch memory N in FIG. 1. The flip-flop circuit F.F. latches a "1" output from the OR circuit $OR_1$, in response to a "1" output from a circuit comprised of AND circuits $AND_3$ and $AND_4$ and an OR circuit $OR_2$ to which the signals 9, 12, 8 and WCL are inputted, to control the state of the decoder by an output 16 from the flip-flop circuit F.F.

As apparent from the foregoing description, in accordance with the present invention, the time required for data transmission is generally less than Nt and, thus, the data transmission time can be reduced very much as compared with the conventional system. It is further to be noted that this system is compatible with an old system because this system requires no special alteration to the hardware of the broadcasting station and it will suffice for the broadcasting station only to change the data format.

We claim:

1. A data-transmission and data-processing system comprising a plurality of data receiving stations each having a decoder and a central station for transmitting data containing address data and condition data to the decoders of the data receiving stations to be accessed, said address data and condition data being time-sequentially separated from each other, each of said decoders including:

data separating means for time-sequentially separating the address data and the condition data from the data received by the decoder;

address generating means for generating an address of the decoder;

first store means for storing a present address data and a previous address data from said data separating means;

second store means for storing a present condition data and a previous condition data from said data separating means;

first comparing means for comparing said present and previous address data from said first store means;

second comparing menas for comparing said present and previous condition data from said second store means; and multiplex means for outputting said present condition data in response to comparison outputs from said first and second comparing means.

2. A data-transmission and data-processing system as claimed in claim 1 wherein said data separating means, and said first and second store means are formed of a shift register.

* * * * *